INVENTORS:
STUART G. MC GRIFF
WAYNE A. MC RAE

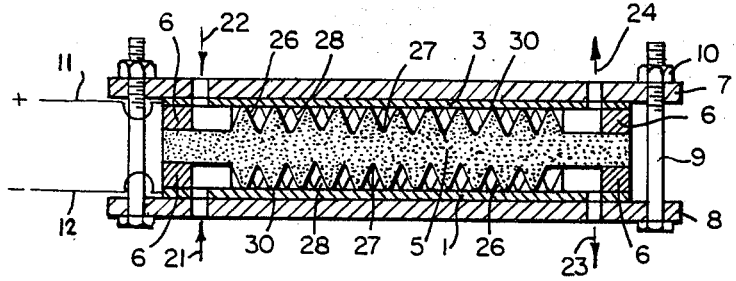

United States Patent Office 3,496,091
Patented Feb. 17, 1970

3,496,091
ELECTROLYTIC-ELECTRODIALYSIS APPARATUS
Stuart G. McGriff, Alexandria, Va., and Wayne A. McRae, Lexington, Mass., assignors to Ionics, Incorporated, Watertown, Mass.
Filed Apr. 15, 1966, Ser. No. 542,780
Int. Cl. B01k 3/10
U.S. Cl. 204—301     5 Claims

ABSTRACT OF THE DISCLOSURE

This invention is directed to a two compartment electrolytic apparatus containing a continuous ion-conducting bridge of ion-exchange material between and in contact with the spaced anode and cathode electrodes. The apparatus is employed in a process for electrolytically producing hydrazine at the anode area of the apparatus from an ammonia containing fluid solvent.

---

This invention relates to novel apparatus and methods for producing hydrazine by the electrolysis of ammonia solutions and, in particular, to electrolytic cells utilizing electrolytes of solid ion-exchange material for the production of anhydrous hydrazine.

Hydrazine ($N_2H_4$) finds its greatest use as a rocket fuel, but also as an oxygen scavenger in boiler water; as an intermediate in drug manufacture; as a plant growth retardant and in rubber blowing. The recent developments in new catalysts make hydrazine of increasing interest as a monopropellant and as a source of energy for fuel cell applications. However, the present cost of hydrazine is too high for widespread commercial use.

Almost all of the present production of hydrazine is based on the chemical oxidation of ammonia or urea in aqueous solutions by employing an oxidizing agent of an alkaline hypochlorite. The hydrazine is obtained as a dilute aqueous solution containing many contaminants and the commercial product of hydrazine hydrate or anhydrous hydrazine is produced with difficulty and great expense. Attempts have been made to produce hydrazine by electrolysis, using a variety of operating conditions and starting materials, but none appear to be sufficiently inexpensive for general use.

In the electrolysis of liquid ammonia, hydrazine is one of the first products formed by the anodic oxidation of ammonia. Liquid ammonia, like pure water, is a poor electrical conductor and is only slightly ionized into ammonium and amide ions, as shown in the following reaction: $2NH_3 \rightleftharpoons NH_2^- + NH_4^+$. During the electrolysis, the negatively charged amide ions are discharged by oxidation at the anode with a pair combining to form hydrazine. However, because of the poor conductance of liquid ammonia, the prior art has resorted to adding soluble electrolytes to the ammonia to form a solution having increased electrical conductance. Such electrolytes, soluble in liquid ammonia, include, for example, sodamide, ($NaNH_2$) sodium hydroxide, ammonium salts, including ammonium sulfonate and urea. Although the high degree of dissociation of the electrolytes do in fact increase the electrical conductivity of the resulting solution, their presence can be detrimental to the production of hydrazine.

Hydrazine is thermodynamically unstable and therefore readily susceptible to decomposition. Since hydrazine is more susceptible to oxidation than ammonia, the hydrazine formed at the anode, if allowed to remain in the area of the anode, will quickly decompose. Many materials are known that will catalyze or accelerate this decomposition, such materials being halide ions, heavy metal ions and strong proton acceptors, such as the amide and hydroxide ions. Additionally, certain materials used in the construction of the anodes will more readily chemisorb hydrazine with its resultant decomposition.

In accordance with the present invention, solutions of ammonia in contact with an electrolyte of solid ion-exchange material are subjected to electrolysis to produce hydrazine at the anode. The electrolytic apparatus has a continuous bridge of a solid ion-exchange resin between and in intimate contact with the spaced cathode and anode electrodes. The ion-exchange material bridging the space between the electrodes will function to provide an electrically conducting path since the ammonia solution passing into the cell will have a high electrical resistance. In the equilibrium between the ion-exchange resin and a solution, the concentration of mobile ions in the resin is not highly dependent upon the concentration of ions in the surrounding solution, but is essentially determined by the number of exchange sites within the resin itself. Thus, in the case of an anion-permeable resin, it is possible to have a high concentration of mobile negatively charged amide ions ($NH_2^-$) within the resin to obtain the required electrical conductance without the addition of soluble salts or electrolytes to the ambient solution. This technique provides an available source of amide ions. The hydrazine formed at the anode will dissolve in the liquid, and the resulting solution will be removed from the cell before there is any substantial contact between the hydrazine in solution and amide ions in the resin. The result of this process is that hydrazine is formed in the liquid solution with the solution isolating the hydrazine from contact with catalytic materials which would cause excessive decomposition.

Therefore, the object of this invention is to provide a novel apparatus and process to produce hydrazine economically from liquid ammonia solutions by electrolysis.

A further object is to produce hydrazine derivatives by the process applicable to hydrazine by substituting amines in place of ammonia.

A further object is to economically prevent the further decomposition or oxidation of hydrazine once it is electrolytically formed.

A further object is to utilize a solid electrolyte of ion-exchange resin in contact with ammonia to manufacture hydrazine electrolytically.

A further object is to employ a semi-conducting anode for electrolytically oxidizing ammonia into hydrazine.

These and various other objects, features and advantages of the invention will appear more fully from the detailed description which follows accompanied by the drawings. To better understand the invention, the description is made with specific reference to certain preferred embodiments; however, it is not to be construed as limited thereto except as defined in the appended claims. By way of example, the use of this invention will now be described in detail with reference to the accompanying drawings in which:

FIGURE 2 is a sectional view of an assembled cell taken along lines 2—2 of FIGURE 1, showing the membrane in contact with both electrodes.

FIGURE 3 is a modification of an ion-exchange membrane in which both sides have a corrugated design.

FIGURE 4 is a cross-sectional view of a corrugated ion-exchange membrane taken along line 4—4 of FIGURE 3.

FIGURE 5 illustrates schematically the process for producing hydrazine electrolytically by employing an anion-selective membrane in the electrolytic cell and FIGURE 6 illustrates schematically an alternate process using an cation-selective membrane.

Figure 1:
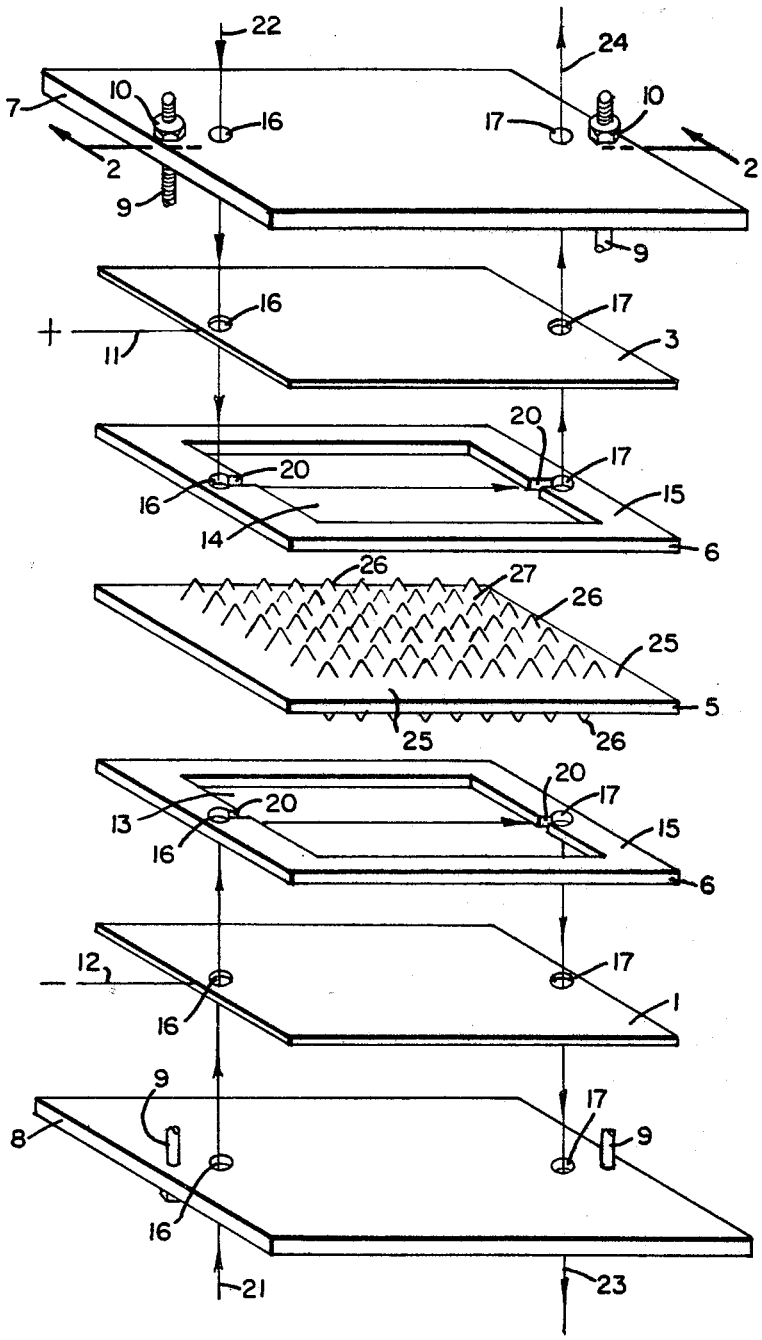
FIGURE 1 is an exploded perspective view of one embodiment of the improved electrolytic cell of the present invention wherein the solid electrolyte of ion-exchange resin is in the form of a membrane having pebbled surfaces.

As shown in the drawings and, in particular, in FIGURES 1 and 2, the electrolytic cell is basically of a package or stack type. The apparatus comprises a cathode 1, an anode 3, an embossed or contoured ion-permselective membrane 5 and spacer members 6, all of which are assembled between two terminal pressure end plates 7 and 8. A fluid-tight stack is obtained by applying the proper pressure against each end plate, as by bolts 9 and nuts 10. Means for passing a DC potential transversely through the stack is provided for through leads 11 and 12 from an outside source of electric current (not shown).

The spacer members 6 are generally of an electrically non-conducting plastic gasketing material such as polyethylene and have cut-out central portions 13 and 14 which form the cathode and anode fluid-holding chambers, respectively. These chambers are confined by the frame or border 15 of the spacer which also functions to separate and gasket the substantially flat marginal area 25 of the membrane with respect to the adjacent electrodes 1 and 3. The spacers, electrodes and end plates are shown with apertures 16 for directing a fluid to the cathode and anode chambers 13 and 14 and further apertures 17 are provided for withdrawing fluid therefrom. The apertures 16 and 17 in the frame 15 of the spacer are located on substantially opposite sides of the cut-out flow area. The apertures 16 and 17 in the frame of the spacer communicate with the respective cathode and anode chambers by slits or channels 20 cut in the spacer material. Inlet means for passing fluid into the cathode and anode chambers are provided by inlets 21 and 22 respectively, and outlet means for withdrawing the solutions are provided at 23 and 24. The combination of a cathode and an anode chamber, membrane and terminal electrodes form a single electrolytic unit.

The single membrane 5 separating the electrode chambers 13 and 14 from each other is fabricated from an organic polymeric cross-linked material and may be anion permselective or cation perselective, both types of material being well known in the art.

The manufacture and properties of ion-selective membranes are fully disclosed in U.S. Patents Nos. 2,702,272; 2,730,768; 2,731,408; 2,800,445; Re. 24,865, and many others. Ion-exchange membranes are comprised of a solvated ion-exchange resin generally in sheet form which may be reinforced by an inert woven fabric structure. Such membranes generally comprise about 30% fabric by weight, 40% resin, and about 30% solvent, the solvent being uniformly dispersed throughout the resin.

Cation membranes are typically cross-linked sulfonated polystyrene. In the presence of imbibed solvent having at least a moderate dielectric constant, for example, dimethyl formamide, the sulfonate groups are dissociated into bound negatively charged ions and mobile positively charged counter-ions. The positively charged counter-ions are free to diffuse through the resin structure and, under the influence of an electric potential, are substantially the sole carrier of current. Typical positively charged counter-ions, for example, are sodium and ammonium. Similarly, the anion membranes may be a cross-linked polystyrene structure with quaternary ammonium salt groups which dissociate into bound positively charged quaternary ammonium ions and mobile negatively charged counter-ions such as, for example, hydroxide, sulfate and, in some non-aqueous solvents, the amide ion.

Generally, conventional ion-selective membranes are fabricated as sheets having totally flat surfaces. However, the membranes of the present invention are provided on both major faces with an elevated central area integrated with and generally of the same polymeric ion-exchange material as the substantially flat marginal sealing area 25 of the membrane to form a single homogeneous piece. The surface of the central area is embossed or contoured with a plurality of projecting 26 and receding 27 portions. The receding portions are so arranged as to form flow channels 28 between the projections for the passage of fluid therethrough. As shown in the drawings, the contoured central area of the membrane is pebbled (FIGURE 1) or corrugated (FIGURE 3) but other various geometric designs, such as ribs, studs, ridges and the like may be provided on the surface.

When the elements comprising the electrolytic cell are assembled into a fluid-tight stack arrangement, the projecting central portions 26 of the membrane will extend directly into the central cut-out portions 13 and 14 of the adjacent spacers which form the cathode and anode chambers. The projections may be about the same height as the spacer thickness. The height of the projections may vary within wide limits but an extension of about 30 mils (0.030″) in a direction perpendicular to the flat surface of the membrane would be satisfactory. Such a membrane embossed on both sides and having a 30 mil thickness across the flat marginal area would then have a total central area thickness of about 90 mils. On assembly of the cell, the tips of the projections are caused to press firmly against the surface of each adjacent electrode to form an electrode-membrane interface 30 which makes electrical contact and forms a continuous ion-conducting bridge between the electrode pair. This arrangement will allow an electric current to be carried between the electrodes, primarily by mobile ions of one sign passing solely through the membrane structure. The recessed areas or interstices between the projections form fluid-flow channels 28. The fluids used in the cell need not necessarily be electrolytically conducting since the electric current will be carried within and across the bridge of ion-conducting membrane material. The membranes can of course be of various thicknesses and have pattern configurations other than those specifically described herein. All other factors being equal, it is evident that the greater the number of projections of membrane area contacting the electrode surface, the smaller the power consumption of the electrolytic cell.

The membranes may be fabricated by sandwiching the liquid polymer mix between two glass plates having the desired patterned surface, polymerizing the mix until solid, and then stripping off the glass molding plates to leave a solid polymerized structure. The pattern serves as the mold for the contoured central portion of the membrane. There are glass molding plates of numerous design patterns which are available commercially. The solid structure is then treated with appropriate chemicals to make them either anion or cation permselective as by quaternization or sulfonation. In order to add strength and flexibility to the membrane, an inert sheet of open-weave cloth or screen material may be incorporated as a backing or reinforcing material within the membrane. In such a method, the liquid mix is poured over the cloth fabric prior to being sandwiched between the glass molding plates. Additionally, in order to prevent or minimize fracturing of the projecting or raised portions of the membrane, especially during assembly of the electrolytic cell when the membrane is compressed between the pair of electrodes, it is preferable that bits of fabric material or fibers of glass or other inert material be suspended in the liquid polymer mix before casting into a membrane. These fibers will structurally reinforce the entire raised membrane area to impart the necessary resistance to cracking.

The operation of the electrolytic apparatus, for example, in the manufacture of hydrazine from ammonia, may be illustrated by referring particularly to FIGURE 5 wherein the membrane is anion-selective and the mobile counter-ions are amide ions ($NH_2^-$).

A catholytic and an anolytic feed solution are directed into inlet 21 and 22 respectively, and caused to flow into the respective cathode and anode chambers across the chambers via the interstices or flow channels 28 formed by the projecting membrane portions and out of the chamber by way of outlets 23 and 24 in the general direction as shown by the arrows of the figures.

The catholytic feed solution is comprised of a nonaqueous inert fluid solvent containing ammonia in dilute concentrations. The feed to the anode chamber is pure anhydrous fluid solvent. The fluid solvent should of course be a solvent for ammonia and hydrazine and, preferably, should have at least a moderate dielectric constant and have a negligible affinity for protons, and should not substantially dissociate into an anion which would have a strong affinity for protons. Another preferred requirement of the solvent is that it have a higher boiling point than that of liquid hydrazine (B.P. 113.5° C.). This requirement evolves from the consideration of recovering the hydrazine from the mixture of hydrazine and solvent issuing as the effluent of the anode chamber. Distillation is a preferred method since two liquids are involved and of course recovery cost will be minimized if the hydrazine has a substantially lower boiling point than the solvent to allow its being boiled off from the bulk of solvent. Suitable solvents meeting the preferred requirement are dimethyl acetamide, dimethyl formamide, dimethyl sulfoxide, and the like.

The electrolysis is carried out using a source of direct current and suitable electrode current densities. A range of about 10 to 100 amps/ft.$^2$ is preferred although current densities outside this range are suitable. During electrolysis, the ammonia in the catholytic solution is reduced at the cathode-membrane interface into hydrogen gas and amide ions as follows:

$$2NH_3 + 2e \rightarrow 2NH_2^- + H_2$$

The hydrogen gas is carried out of the chamber with the flowing catholytic solution. This catholytic solution, now partially depleted in ammonia, is removed from the cell at exit 23 and directed to a gas-liquid separator (not shown) for removal of the hydrogen gas. The solution may then be spiked with additional gaseous or liquid ammonia and recycled back to the cathode chamber of the cell for further processing.

The negatively charged amide ions formed at the cathode will, under the influence of the electric current, migrate across the anion-permselective membrane in the direction of the positively charged anode. On reaching the anode-membrane interface, oxidation of the amide ion will occur with a pair of amide ions combining to form hydrazine as follows:

$$2NH_2^- \rightarrow N_2H_4 + 2e$$

In addition, small amounts of nitrogen and ammonia may also result as products of the oxidation process. The hydrazine formed diffuses out of the membrane, and is carried out of the anode chamber with the flowing solvent to a gas separator (not shown) to remove any nitrogen gas contained therein. The dissolved hydrazine is then separated from the remaining solution by any suitable means, such as distillation, freezing, membrane permeation, or the like. The preferred method would be distillation whereby the solution is stripped of its anhydrous hydrazine and traces of ammonia. Small amounts of hydrazine hydrate may be present in the final product due to unavoidable pickup of water in the system. The ammonia, separated during distillation, may be added to the catholytic feed solution, and the pure solvent remaining is recycled as the feed solution to the anode chamber.

It is important that the hydrazine formed be removed from the vicinity of the anode as quickly as possible. If allowed to remain within the anode area, the hydrazine becomes susceptible to oxidation and can readily decompose as follows:

$$N_2H_4 + NH_2^- \rightarrow N_2H_3^+ + NH_3 + 2e$$

The extent of hydrazine decomposition depends among other things on the anode current density and the concentration of the reactants present at the anode-membrane interface. Where the cell employs an anion-permselective membrane, the reactants would be hydrazine along with amide ions, and naturally the lower their concentration at the interface, the less hydrazine decomposition. Further prevention of hydrazine decomposition can be attained by fabricating the anodes from a material on which hydrazine is not readily chemisorbed. Such anodes may be constructed of impervious graphite, platinum, electrolytic valve metals, such as titanium coated with a precious metal of platinum, and the like. In place of these conventional electrodes, it is further contemplated that semiconducting electrodes be employed to further diminish the hydrazine decomposition process. The preferred material for semi-conducting electrodes is impervious self-bonding carbide having either the n- or p-type conduction. Hydrazine will be less strongly absorbed on properly constructed semi-conducting electrodes and therefore less subject to electro-oxidation or decomposition.

The ion-exchange resin of the membrane does not act as a catalyst in the decomposition of hydrazine. In fact, in its use as the electrolyte of the cell, the concentration at the anode of strong proton acceptors, such as the amide ion, is kept at a low level since the only amide ions contacting the anode are those carrying the electric current in their migration through the ion-exchange membrane. Additionally, since the mobile amide ion is the only conducting ionic species within the anion selective resin which need be present in the process, hydrazine decomposition attributable to heavy metal ions or halides will not occur as would be the case where soluble salts are employed as the electrolyte of the cell.

An alternate embodiment of the invention is diagrammatically illustrated in FIG. 6. The membrane in this modification is cation selective and is in the ammonium ionic form ($NH_4^+$). Operation of this cell is similar to that of FIGURE 5 except that the feed solutions entering the electrode chambers are reversed; that is, the solution of solvent and ammonia is fed to the anode chamber, whereas the pure anhydrous-solvent is fed to the cathode chamber. In the anode chamber, the ammonia is oxidized at the anode-membrane interface to hydrazine and positively charged ammonium ions as follows:

$$4NH_3 \rightarrow N_2H_4 + 2NH_4^+ + 2e$$

To minimize the decomposition of the hydrazine, an excess of ammonia is maintained at the membrane surface. Since ammonia is a stronger base than hydrazine, the hydrazine will be in the free base form and diffuse out of the resin to be carried out of the anode chamber by the flowing anolyte.

The positively charged ammonium ions formed at the anode will migrate through the cation membrane in the direction of the cathode where they will be cathodically reduced at the cathode-membrane interface to ammonium and hydrogen gas as follows:

$$2NH_4^+ + 2e \rightarrow 2NH_3 + H_2$$

The hydrogen gas is then separated from the anolyte effluent solution, the solution is spiked with additional ammonia and the resulting solution of solvent and ammonia is recycled back to the cell as the feed to the anode chamber.

The following examples are further illustrative of the practice of this invention and are not intended to be limiting:

EXAMPLE 1

In a cell constructed as shown in FIGURE 5, the membrane is a trimethylaminated, chloromethylated copolymer of ethyl vinyl benzene and divinyl benzene reinforced with woven polypropylene fabric. The fixed charged groups are quaternary ammonium cations (benzyl trimethyl ammonium). The total thickness of the membrane is about 0.090 inch. The plane of the membrane is vertical and the surfaces of the membrane in the central portion are raised into ribs having a roughly triangular cross-section and having their long dimension in a vertical direction. The ribs project about 0.030 inch from the bulk of the membrane and are on centers of about 0.035 inch. The central portion of the membrane is about 2 inches wide and 7 inches long. The flow in each compartment is upward. The electrodes are smooth platinum and the spacer gaskets are polypropylene. The membrane is converted to the hydroxide form in water in the conventional way and then equilibrated with several changes of methanol to replace the water and with several changes of dimethyl formamide to replace the methanol. The membrane is then assembled into the cell. To convert the membrane to the amide form, a 5 percent solution of sodium amide in anhydrous dimethyl formamide is passed upwardly through the cathode compartment at a rate of about 3 grams per minute. Pure anhydrous dimethyl formamide is passed upwardly through the anode compartment at a rate of about 3 grams per minute. A current of 3 amperes is applied for 2 hours and then the current is turned off and the compartments rinsed with anhydrous dimethyl formamide. In a production run the catholyte is anhydrous dimethyl formamide containing about 5 percent anhydrous ammonia by weight. The catholyte flows at a rate of about 3 grams per minute. The anolyte is anhydrous dimethyl formamide and flows at a rate of about 3 grams per minute. A current of about 3 amperes is applied. After about 3 hours, about 180 grams of anolyte effluent have been collected. Upon analysis by standard iodate solution using amaranth as an indicator, it is found that the collected anolyte contains about 3.75 grams of hydrazine. The current efficiency is about 70 percent. The hydrazine is recovered by fractional distillation.

EXAMPLE 2

In a cell constructed as shown in FIGURE 6, the membrane is a sulfonated terpolymer of vinyl toluene, ethyl vinyl benzene and divinyl benzene reinforced with a woven fabric of glass fibers. The fixed charged groups are sulfonate anions. The total thickness of the membrane is about 0.090 inch. The plane of the membrane is horizontal and the surfaces of the membrane in the central portion are raised into small hillocks rising about 0.030 inch from the surface of the membrane. The hillocks are about 0.060 inch in diameter and are on centers of about 0.075 inch. The central portion of the membrane is about 2 inches wide and 7 inches long. The flow in each compartment is horizontal and in a composite direction parallel to the long dimension of the central portion. The electrodes are self-bonded silicon carbide having n-type carriers. The gaskets are polytetrafluoroethylene. The membrane is converted to the ammonium form in water in the conventional way and then equilibrated with several changes of methanol to replace the water and with several changes of dimethyl acetamide to replace the methanol. The membrane is then assembled into the cell. In a production run, the catholyte is anhydrous dimethyl acetamide, flowing at a rate of about 3 grams per minute. The anolyte is anhydrous dimethyl acetamide containing about 5 percent anhydrous ammonia by weight. The anolyte flows at a rate of about 3 grams per mintue. A current of about 3 amperes is applied. The product of the first two hours of operation is discarded and the product of the anolyte of the next three hours is collected. The amount collected is about 180 grams. Upon analysis by standard iodate solution using amaranth as an indicator, it is found that the collected anolyte contains about 3.20 grams of hydrazine. The current efficiency is about 60 percent. The hydrazine is recovered by fractional distillation.

EXAMPLE 3

The cell of Example 2 is operated with 10 percent methyl amine in anhydrous dimethyl sulfoxide as the anolyte and impervious graphite electrodes. The catholyte is anhydrous dimethyl sulfoxide. Dimethyl hydrazine (probably the symmetrical compound) is recovered from the anolyte. The current efficiency is about 70 percent.

What is claimed is:

1. A two-chamber apparatus for the electrolytic production of hydrazine comprising a pair of electrodes separated by a polymeric ion-permselective membrane disposed in relationship to said electrodes to form spaced cathode and anode electrode chambers, said chambers bounded by spacer frame members which separate and gasket the marginal area of said membrane from its adjacent electrode, each major face of said membrane comprised of a substantially flat marginal area and a raised or elevated central area which is integral with and of the same polymeric material as said marginal area, said central area characterized by having a surface contoured with a plurality of projecting and receding portions, said projecting portions extending into the adjacent electrode chamber with at least some of said projections providing contact with the electrode surface adjacent thereto to form an ion-conducting bridge between said spaced electrodes, separate inlet and outlet means for passing a fluid into and out of each of said cathode and anode chambers, respectively, and means of passing a direct current across said spaced electrodes.

2. The apparatus of claim 1 wherein the anode electrode is fabricated with a semi-conducting material of silicon carbide.

3. The apparatus of claim 1 wherein the membrane is anion-permselective.

4. The apparatus of claim 1 wherein the membrane is cation-permselective.

5. The apparatus of claim 1 wherein at least certain areas of the membrane's projecting portions are reinforced with fibers of inert material.

References Cited

UNITED STATES PATENTS

| | | | |
|---|---|---|---|
| 2,735,812 | 2/1956 | Van Hoek | 204—301 |
| 2,799,644 | 7/1957 | Kollsman | 204—301 |
| 2,970,098 | 1/1961 | Ellis | 204—301 |
| 3,219,567 | 11/1965 | Lacey | 204—180 |

JOHN H. MACK, Primary Examiner

A. C. PRESCOTT, Assistant Examiner

U.S. Cl. X.R.

204—180, 296